(12) United States Patent
Sepponen

(10) Patent No.: US 6,259,896 B1
(45) Date of Patent: *Jul. 10, 2001

(54) DEVICE FOR RADIO COMMUNICATION

(75) Inventor: Raimo Erik Sepponen, Helsinki (FI)

(73) Assignee: Nokia Mobile Phones Limited, Salo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/062,992

(22) Filed: Apr. 20, 1998

Related U.S. Application Data

(63) Continuation of application No. 08/507,346, filed on Aug. 15, 1995, now Pat. No. 5,787,340.

(30) Foreign Application Priority Data

Feb. 15, 1994 (WO) ..................................... PCT/FI94/00063

(51) Int. Cl.[7] ....................................................... H04B 1/38
(52) U.S. Cl. .............................. 455/90; 455/117; 455/128
(58) Field of Search ............................... 455/90, 117, 128, 455/347–348, 300, 351, 129, 95, 100; 379/428, 430, 433, 437, 447, 440, 452, 451, 455, 426, 446, 449; 343/841, 702, 718; 250/515.1; 174/35 R

(56) References Cited

U.S. PATENT DOCUMENTS

| | | |
|---|---|---|
| 3,435,456 | 3/1969 | Robb, Jr. . |
| 5,045,637 | 9/1991 | Sato et al. . |
| 5,150,282 | 9/1992 | Tomura et al. . |
| 5,151,946 | 9/1992 | Martensson . |
| 5,177,784 | * 1/1993 | Hu et al. ............................ 379/433 |
| 5,335,366 | 8/1994 | Daniels . |
| 5,336,896 | 8/1994 | Katz . |
| 5,444,866 | 8/1995 | Cykiert . |

FOREIGN PATENT DOCUMENTS

| | | |
|---|---|---|
| 2022958 | 2/1992 | (CA) . |
| 0 522 538 A2 | 1/1993 | (EP) . |
| 2 240 782 | 8/1991 | (GB) . |
| 59-92629 | 5/1984 | (JP) . |
| 3-238936 | 10/1991 | (JP) . |
| 4-220851 | 8/1992 | (JP) . |

OTHER PUBLICATIONS

Shielding Against Electromagnetic—Published in the Mar./Apr. 1979 issue of Plastics Design Forum.

* cited by examiner

*Primary Examiner*—Nguyen T. Vo
(74) *Attorney, Agent, or Firm*—Reising, Ethington, Barnes, Kisselle, Learman & McCulloch, PC

(57) ABSTRACT

A device for radio communication (PH), such as for example radiophone, includes a shielding layer (RFS) which under operating conditions is between the antenna and the user. The shielding layer (RFS) reduces electromagnetic irradiation of the user. The shielding layer (RFS) may be movable in such a manner that it serves as a cover of some operational devices such as for example, the headphone, display and keyboard of the apparatus when it is not used.

42 Claims, 6 Drawing Sheets

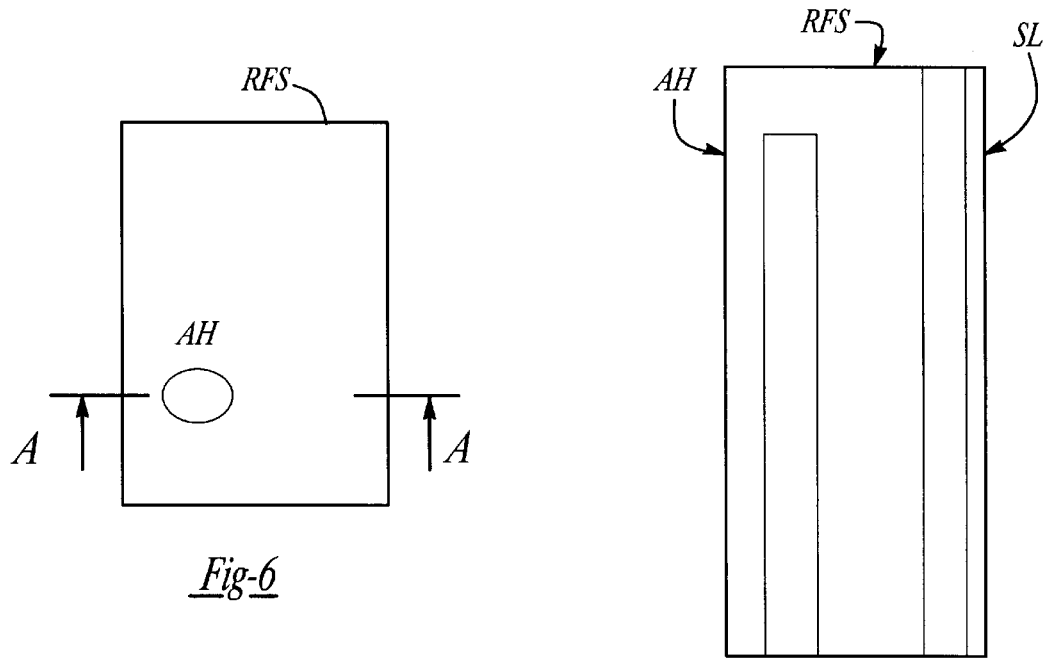
*Fig-6*
*Fig-6A*
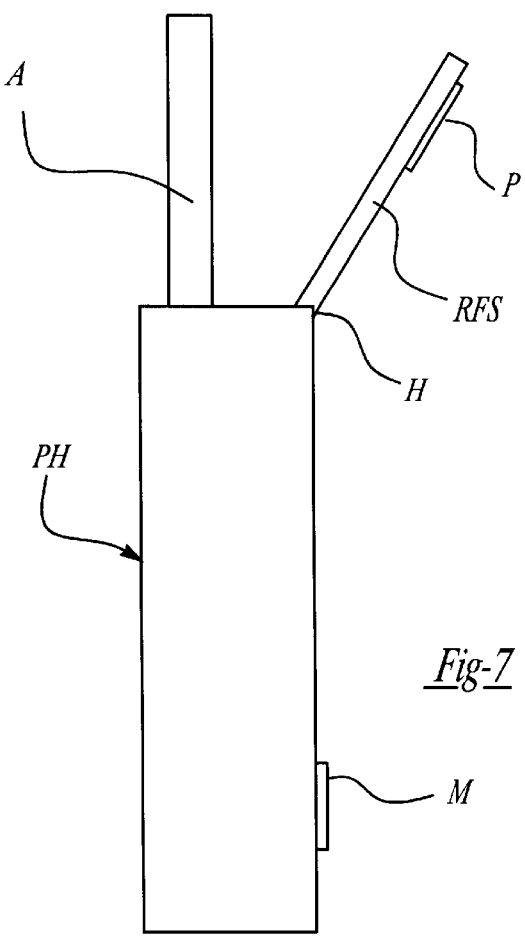
*Fig-7*

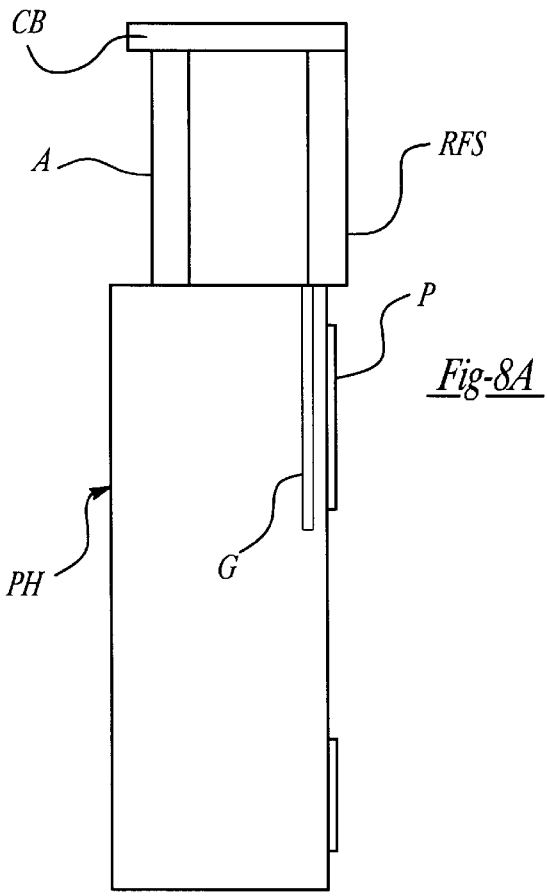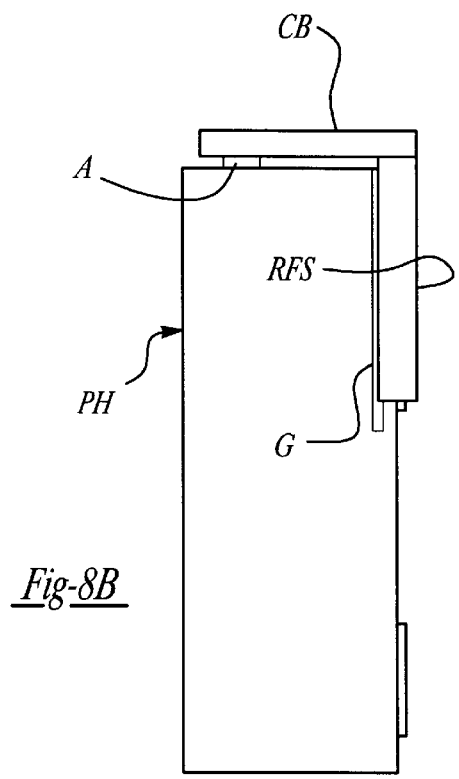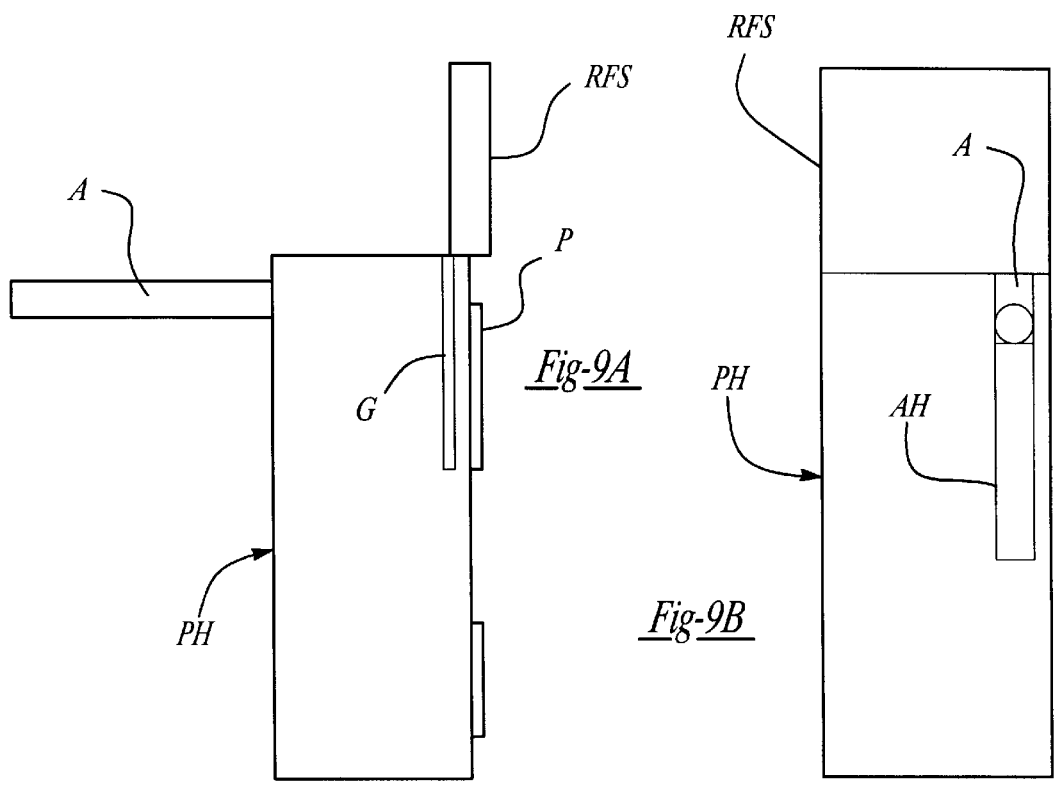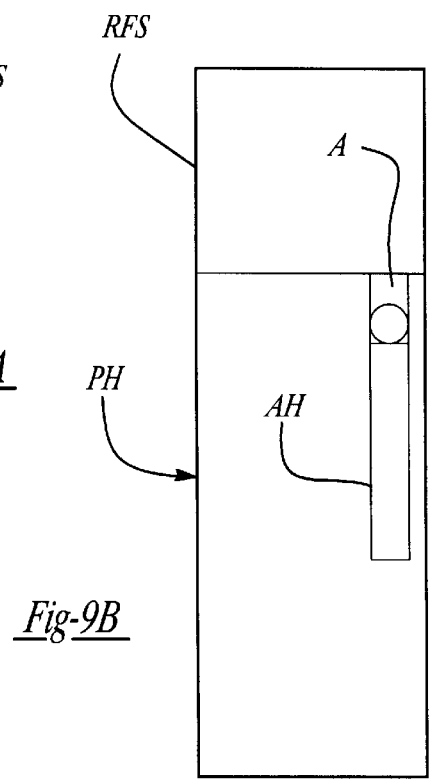
Fig-8A
Fig-8B
Fig-9A
Fig-9B

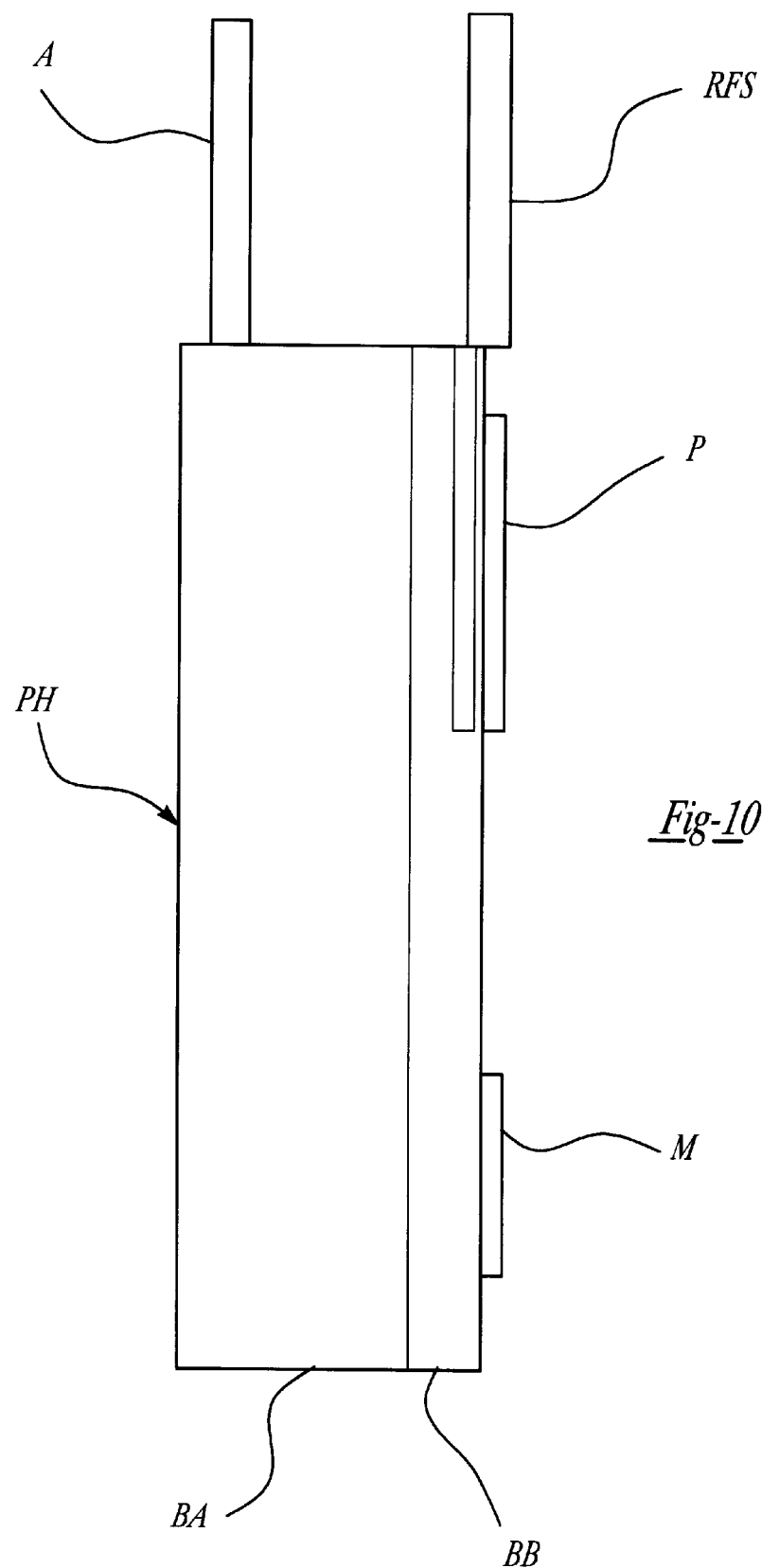

DEVICE FOR RADIO COMMUNICATION

This application is a continuation of prior application No. 08/507,346 filed on Aug. 15, 1995 (now U.S. Pat. No. 5,787,340).

TECHNICAL FIELD

The present invention relates to an apparatus for radio communication, such as for example a radiophone.

The popularity of radiophones has been rapidly increasing during the last ten years. At the same time a belief of potential health hazards related to non-ionizing radiation has been increasing. The power radiated by a radiophone is relatively low, typically few hundred milliwatts. On the other hand the antenna means of radiophones are few centimeters from the brain, the hearing organs and the organ of equilibrium. Although a direct heating effect could be left without further consideration it has been suggested that modulated radio frequency radiation induces changes in the electrical status i.e. in the ion balance of nerve cells. A continuous localized exposure to radio frequency irradiation has been suggested to weaken myelin sheets of cells and to eventually lead to an impairment of hearing capability, vertigo etc.. It has been suggested that radio frequency irradiation may stimulate extra growth among supportive cells in the nerve system, which in the worst case it has been suggested could lead to a development of malignant tumor e.g. glioma from supportive cells. Although the consequences, described above have not been scientifically verified, the uncertainty has some effects e.g. by reducing the speed of growth of the market of radiophones.

SUMMARY OF THE INVENTION

The invention avoids the drawbacks of the prior art and reduces the irradiation of the user, especially the brain and the nerve tissues. The invention and corresponding apparatus based thereon are characterized by what is not forth in the characterizing sections of the annexed claims.

BRIEF DESCRIPTION OF THE DRAWINGS

The invention will now be described in more detail with reference made to the accompanying drawings, in which:

FIGS. 6–6a show another construction of the shielding layer of a radiophone of the invention.

FIG. 7 shows another radiophone of the invention.

FIGS. 8a–8b show a third radiophone of the invention.

FIGS. 9a–9b shows a fourth radiophone of the invention.

FIG. 10 shows one solution of the invention to increase the protection of the user against the irradiation from the radiophone.

DETAILED DESCRIPTION OF THE PREFERRED EMBODIMENT

Figures 1, 2:
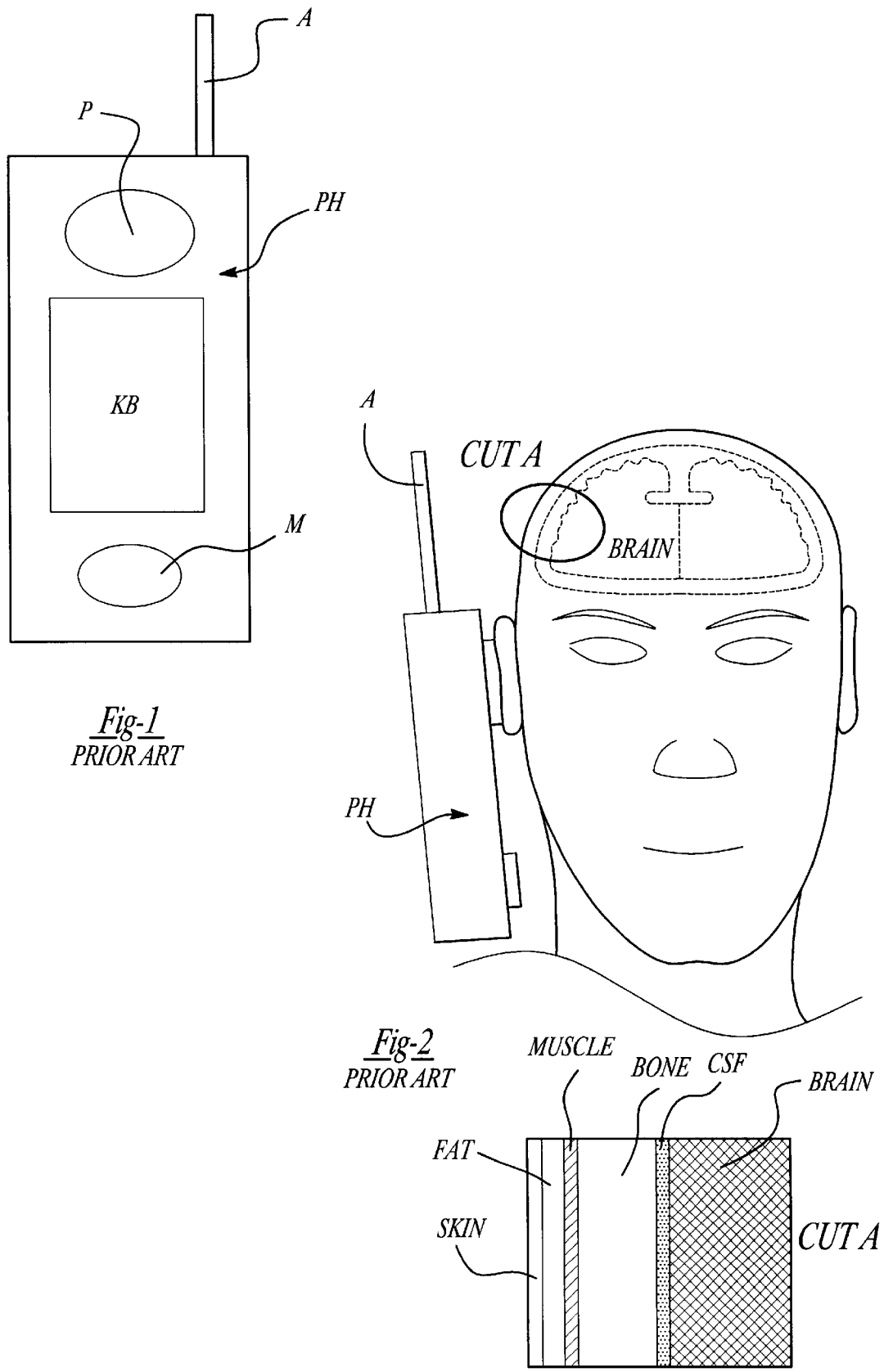
FIG. 1 shows the main features of a radiophone of the prior art.
FIG. 2 shows schematically the position of a radiophone relative to the users head and lists major tissues which are penetrated by electromagnetic radiation omitted by the radiophone.
Figure 3A:
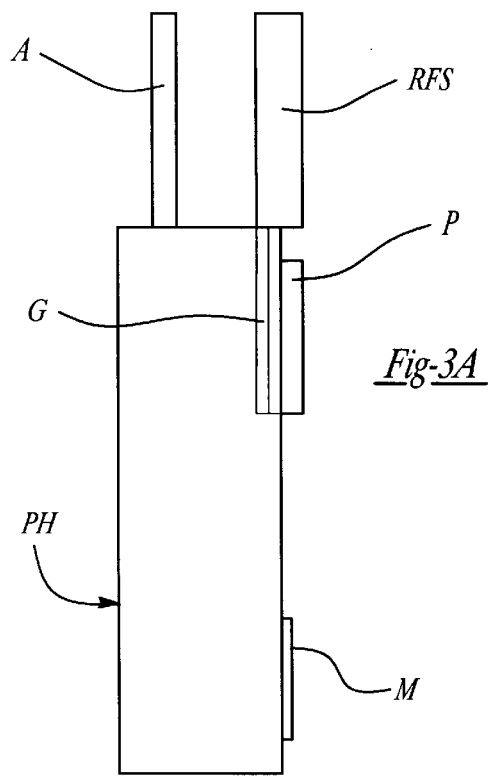
FIGS. 3a–3d when a radiophone of the invention.
Figure 3B:
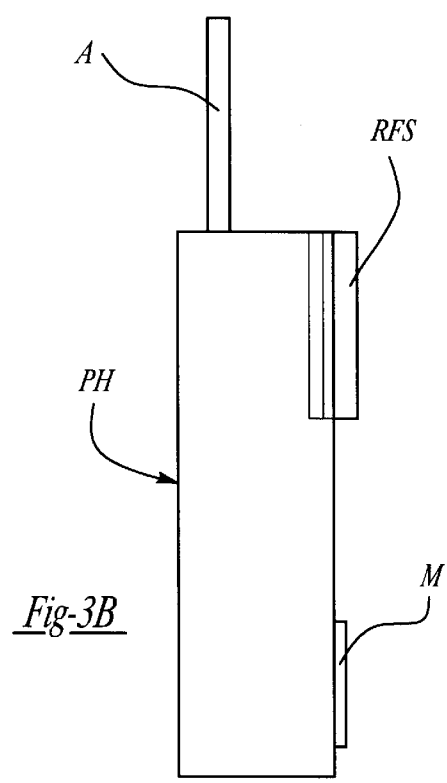
Figure 3C:
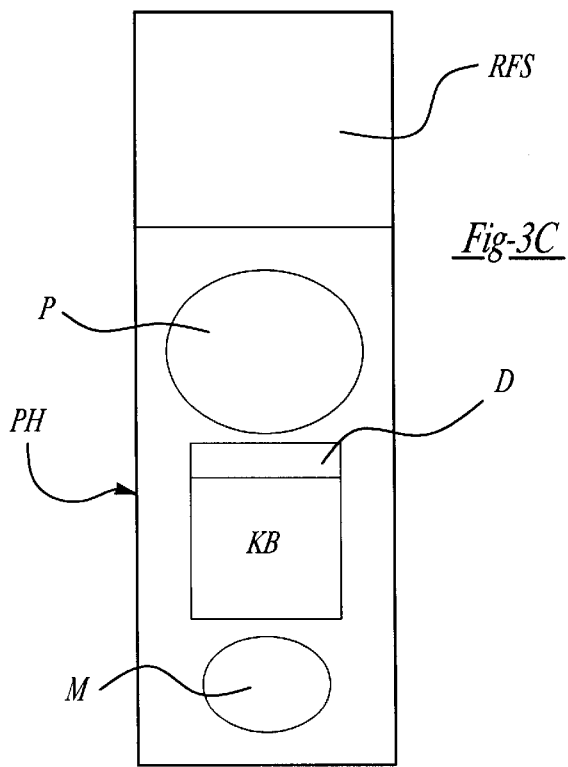
Figure 3D:
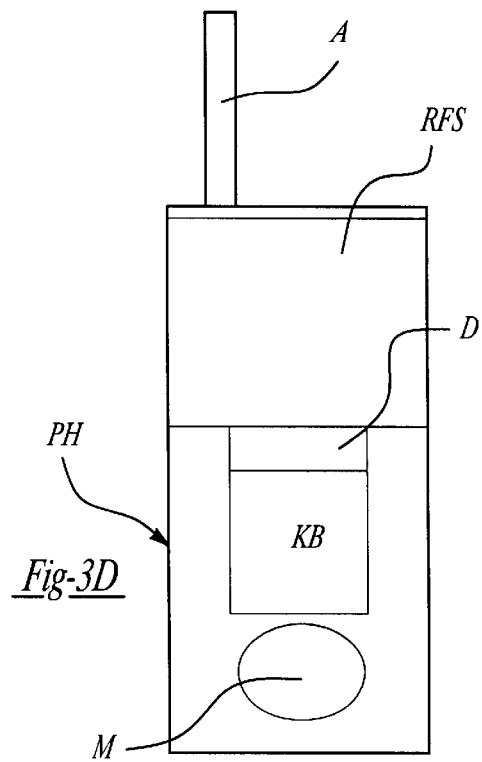

FIG. 1 shows the most prominent parts of a radiophone which are visible from outside: A is an antenna, which is typically so called helix type. In most radiophones the antenna is covered with rubberlike material with carefully selected electrical properties. When the radiophone is not to be used the antenna may be positioned at least partially inside the body of the radiophone. In some devices the part which is left outside is also designed to operate as an antenna with reduced radiation efficiency and reception sensitivity.

The following parts are also visible: M is a microphone, P is a headphone and KB is a keyboard.

FIG. 2 shows schematically a position of antenna A of radiophone PH relative to brain BRAIN. The view CUT A is shown in the lower section of the figure. As shown in the figure, the power radiated by A is first penetrating a thin skin layer SKIN and thereafter a fat layer FAT. Either of these layers does not significantly attenuate or reflect electromagnetic radiation. A muscle layer MUSCLE of the head is relatively thin, therefore this layer does not markedly attenuate the penetration power. Bone and bone marrow do not significantly attenuate penetrating, radiation, although this layer is relatively thick. It has been suggested that, most of the incoming energy is absorbed by cerebrosphinal fluid CSF and brain tissue BRAIN. CSP layer is usually thin. Because antenna A is very close to brain tissue and the distance is much shorter then the wavelength of usually used electromagnetic oscillation, it has been suggested that the irradiation of brain tissue is rather significant.

FIG. 3 shows one solution of the invention to reduce the coupling between antenna A and tissues of user. There are guides G in the body of apparatus PH and a shielding layer RFS which slides along C. When PH is to be used, RFS is at the upper position as shown in FIG. 3a. RFS is between the radiating part of the antenna means and the user. When PH is not to be used, RFS is at the lower position as shown in FIG. 3b. In order to enforce the use of RFS, RFS is arranged to cover phone P as PH is not to be used. RFS may cover also the display D and the keyboard KB of PH, the possibility is that P is attached to RFS and it moves to the using position with the RFS. FIG. 3c shows the frontview of PH in the same situation as FIG. 3a. FIG. 3d shows the frontview of PH in the same situation as FIG. 3b.

RFS maybe manufactured from electrically conductive plastic or plastic which is covered with a conductive layer or plastic sheet with a conductive layer inside or just metal. The conductive layer may be slitted, a mesh, or solid. The operation may be easily understood: A part of the power radiated by A is reflected by the conductive surface of RFS and the electric field is coupled via RFS to the electrical ground of PH. The coupling between the electrical ground and RFS assumes a connection at the operation frequency between the ground and RFS. RFS affects the properties of antenna means A and this effect must be taken into account in the design of the antenna means. The shielding effect of RFS improves the operation conditions of the antenna means because the loading effect of tissues is small.

Figure 4:
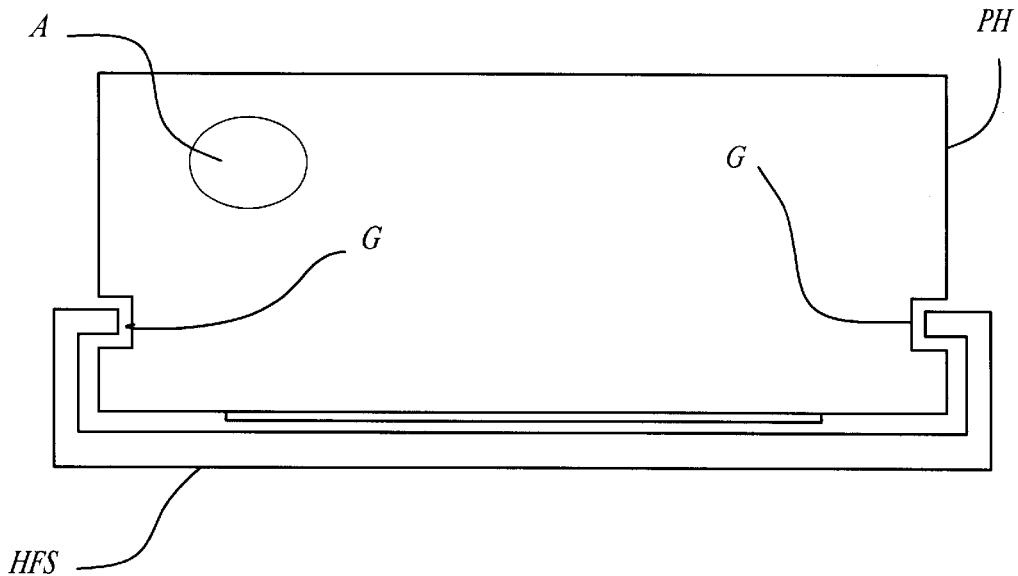
FIG. 4 shows a detail of a radiophone of the invention seen from the side of the antenna.

FIG. 4, shows one embodiment of the invention for RFS. The guides G are grooves in the body of PH. RFS glides up and down along G. Obviously one may construct means e.g. flexible springs which lock RFS in the operational and resting positions. There may also be micro-switches, which enable the use of PH only when RFS is in the operational position.

Figure 5A:
FIGS. 5a–5b show construction of the shielding layer of a radiophone of the invention.

FIG. 5a shows one possible construction of RFS. L1 is a layer which has electrical characteristics different from those of layer L2. L2 may be a reflective, conductive layer and L1 is from some material which has a high dielectric constant (e.g., ceramics) and/or a high permeability (e.g. ferrite), which changes the wavelength so that the reflection from the layer L2 is as efficient as possible. Because of this the operation conditions of the antenna means are improved and the irradiation of the user is reduced.

Figure 5B:
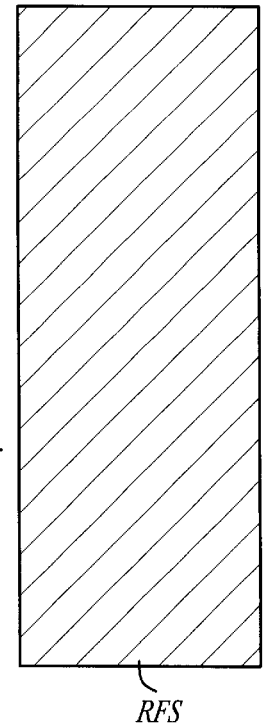

FIG. 5b shows an embodiment, in which RFS is constructed from material, like a composition of plastic and graphite, which absorbs energy radiated by the antenna.

FIG. 6 shows one embodiment of the invention which enables a reduction of the irradiation generated by apparatus already in the market. RFS is positioned over the antenna so that the antenna is fixed on the antenna support. AH and SL, the shielding part of RFS is placed between the antenna and the user. FIG. 7 shows RFS which moves guided by the hinges H in the using position. In this case RFS may form a part of the protective cover of PH.

FIG. 8 shows one embodiment of the invention, where RFS and A are mechanically connected with a bar or a plate CB. As A is moved to the operational position, RFS moves simultaneously to the operational position (FIG. 8a). FIG. 8b shows A and RFS in the resting position.

FIG. 9a shows a side view of PH, where A in the operational position is unconventionally directed away from the user. RFS reduces the amount of power absorbed by the user. FIG. 9b shows the rear view of PH. When not used, A is in the antenna holder AH, from where A is at first pulled out and then turned in the using position.

FIG. 10 shows an embodiment of the invention which further increases the protection of the user. The box of PH consists of at least two parts BA and BB, from which BB is electrically conductive. RFS and BB forms a solid layer which reflects the power radiated by A away from the user and prevents a direct connection between the user and the radiative parts of PH. Depending on the wavelength and the other technical features of the device BB may be connected to the electrical ground of PH. BA may be made from insulating material. The relationship between BA and BB is determined by the operational frequency, the constructions of the antenna means and the electronics.

There are other alternative designs of hinges H than those shown by FIG. 7. RFS may turn sidewise or the hinges may include constructions which generate more complicated movements of RFS.

The above only describes a few embodiments of the invention. The invention can be subjected to a plurality of modifications within the scope of the inventional concept defined in the appended claims.

What is claimed is:

1. A portable radio telephone having a male body, and operating components including a headphone, keyboard, display and microphone positioned to be used from the exterior o said main body, an antenna, and a shield, said telephone characterized by:

said antenna having a section for radiating electromagnetic radiation that extends out from said main body, said shield being made from electrically conductive material and being coupled at the operating frequency of the antenna to an electrical ground of the portable radio telephone; said shield under operational conditions being extended beyond said body and located between a user and the extended radiating section of the antenna such that it reduces electromagnetic irradiation of the user from said antenna;

said shield being arranged to interfere with the headphone function by covering the headphone when said shield is in a rest position;

said shield being constructed to interfere with the headphone by having said headphone mounted on said shield and dislocating the headphone from its unable location when said shield is in its rest position.

2. A portable radio telephone as claimed in claim 1 further characterized by:

said shield being movable from its retracted rest position to an extended shielding position;

said headphone mounted on said shield and movable with said shield to a raised properly located usable position and a retracted position; and said antenna being raised to extend out of said main body when said antenna is in its extended radiating position.

3. A portable radio telephone as claimed in claim 1 further characterized by:

said shield being arranged to disable use of one of said keyboard and display by covering said respective keyboard or display when said shield is in said rest position.

4. A portable radio telephone as defined in claim 1 further characterized by:

said shield being hinged in proximity to an edge of said telephone main body and pivotably movable between a retracted rest position and an extended raised position;

said headphone mounted on said hinged shield such that it faces a user when the shield is in its extended operating position and covered under said shield facing said main body when said shield is pivoted to its retracted rest position; and said antenna being raised to extend out of said telephone main body when said antenna is in its extended radiating position.

5. A portable radio antenna as claimed in claim 4 further characterized by:

said headphone and antenna mounted at a diverging angle with respect to each other such that when a user has an ear against said headphone, said antenna is angularly directed away from said user.

6. A portable radio telephone as defined in claim 5 further characterized by:

said headphone being mounted at an angle with respect to said main body.

7. A portable radio phone as defined in claim 6 further characterized by:

said shield when in the extended shielding position being canted away from and forwardly from a front face of the main body to form an obtuse angle with said main body.

8. A portable radio telephone having a main body mounting a display; a keyboard, and a headphone; an antenna having an extending radiating section located outside of said body for radiating electromagnetic radiation, and a shield; the improvement characterized by:

said shield being movable between an extended operational shielding position that is located between the user and the radiating section of the antenna thereby reducing electromagnetic irradiation of the user from said extending section of said antenna; and a retracted rest position in proximity against said main body;

the headphone being attached to the shield and movable to its usable portion with the shield when the shield is moved to its extended shielding position and located to a stored position when the shield is moved to its retracted rest position.

9. A portable radio telephone as defined in claim 8 and further characterized by:

said shield being hinged in proximity to an edge of said telephone main body and pivotably movable between a retracted rest position and an extended raised position;

said headphone being mounted on said hinged shield such that it faces a user when the shield is in its extended operating position and covered under said shield facing said main body when said shield is pivoted to its retracted rest position.

10. A portable radio antenna as defined in claim 9 further characterized by:

said shield being made from electrically conductive material, and being coupled at the operating frequency of the antenna to an electrical ground of the apparatus.

11. A portable radio phone as defined in claim 9 further characterized by:

said shield when in the extended shielding position being canted away from and forwardly from a front face of the main body that houses the keyboard and display of the main body and faces the user when in use to form an obtuse angle with said main body.

12. A portable radio telephone having a main body and an antenna for radiating electromagnetic radiation, said antenna extending outward from the main body, said telephone characterized by:

a shield movable between a stored rest position and an extended shielding position located between the user and the antenna such that it reduces electromagnetic irradiation of the user from said antenna, said shield operably connected to the telephone such that at least one control function is disabled when the shield is in the stored rest position and enabled only when the shield is in the shielding position;

said shield being movable from its retracted rest position to an extended shielding position;

said headphone mounted on said shield and movable with said shield to a raised properly located usable position and a retracted position; and said antenna being raised to extend out of said main body when said antenna is in its extended radiating position.

13. A portable radio telephone as defined in claim 12 further characterized by:

said shield when in its retracted rest position disables said at least one control function of said telephone by covering a respective operating component that controls said at least one control function.

14. A portable radio telephone as defined in claim 12 further characterized by:

said shield being hinged in proximity to an upper edge of said telephone main body and pivotably movable between a retracted rest position and an extended raised position;

said headphone mounted on said hinged shield such that it faces a user when the shield is in its extended operating position and covered under said shield facing said main body when said shield is pivoted down to its retracted rest position; and said antenna being raised above said telephone main body when said antenna is in its extended radiating position.

15. A portable radio phone as defined in claim 12 further characterized by:

said shield when in the extended shielding position being canted upwardly and forwardly from a front face of the main body to form an obtuse angle with said main body.

16. A portable radio telephone having a main body, a keyboard, headphone, an antenna for transmitting electromagnetic radiation and a shield, the ratio telephone characterized by:

said shield being interposed between said antenna and said user when in the shielding position;

said headphone when in its usable position and said antenna being mounted at a diverging angle with respect to each other such that when a user has an ear against said headphone, said antenna is angularly directed away from said user;

one of said antenna and said shield being pivotably mounted with respect to the other of said antenna and said shield; and said headphone being mounted on said shield.

17. A portable radio telephone as defined in claim 16 further comprising:

said headphone being mounted at an angle with respect to said main body when in its usable position.

18. A portable radio phone as defined in claim 16 further characterized by:

said shield when in the extended shielding position being canted away from and forwardly from a front face, that faces the user when in use, of the main body that houses the keyboard to form an obtuse angle with said main body.

19. A portable radio telephone as defined in claim 16 further characterized by:

said shield being made from electrically conductive material, and being coupled at the operating frequency of the antenna to an electrical ground of the apparatus.

20. A portable radio telephone as defined in claim 16 further characterized by:

said shield being movable between a retracted rest position and an operatively extended shielding position; and said headphone being positioned to be at an angle with respect to said antenna when said shield is in the extended shielding position.

21. A portable radio telephone as defined in claim 20 further comprising:

said shield when in its retracted rest position disables use of said keyboard by covering said keyboard.

22. A portable radio phone as defined to claim 20 further characterized by:

said shield when in the extended shielding position being canted away from and forwardly from a front face that houses the keyboard of the main body and faces the user when in use to form an obtuse angle with said main body.

23. A portable radio telephone as defined in claim 22 further characterized by:

said shield being hinged is proximity to an upper edge of said telephone main body and pivotably movable between a retracted rest position and an extended raised position;

said headphone being mounted on said hinged shield such that it faces a user when the shield is in its extended operating position and covered under said shield facing said main body when said shield is pivoted down to its retracted rest position; and said antenna being raised to extend out of said telephone main body when said antenna is in its extended radiating position.

24. A portable radio telephone as defined in claim 23 further characterized by:

said headphone mounted coplanar or parallel with said shield and said headphone both being at a divergent angle with respect to said antenna when said shield is in the extended shielding position.

25. A portable radio antenna as defined in claim 24 further characterized by, said shield being made from electrically conductive material, and being coupled at the operating frequency of the antenna to an electrical ground of the apparatus.

26. A portable radio telephone including a main body, a microphone positioned near the one end of said main body; a headphone, an antenna having a section extending out from said main body, and a shield; said telephone characterized by:

said headphone mounted on said shield;

said shield movable to extend to a shielding position beyond an opposite end of said main body and located between a user and the extended radiating section of the antenna; and retractable to a rest position whereby said headphone is movable from its rest position and movable away from said microphone to a usable position.

27. A portable radio telephone as defined in claim 26 further characterized by:

said shield being interposed between said headphone and said antenna when in the shielding position.

28. A portable radio telephone as in claim 27 further characterized by:

said headphone when in its usable position and said antenna being mounted at a diverging angle with respect to each other such that when a user has an ear against said headphone, said antenna is angularly directed away from said user.

29. A portable radio as defined in claim 28 further characterized by:

said shield when in the extended shielding position being canted away from and forwardly of the main body to form an obtuse angle with said main body.

30. A portable radio antenna as defined in claim 29 further characterized by:

said shield being made from electrically conductive material, and being coupled at the operating frequency of the antenna to an electrical ground of the apparatus.

31. A portable radio telephone having a main body, a keyboard, a display, a headphone, a microphone, an antenna extending out of an edge of the main body for transmitting electromagnetic radiation, and a shield, the radio telephone characterized by:

said shield being hinged in proximity to said edge of said telephone main body and pivotably movable between a retracted rest position and an extendable raised position;

said headphone being mounted on said shield;

said shield when in its retracted rest position forms a protective cover for the headphone;

said shield when pivotably moved to its extended raised position exposes said headphone for usage, and is positioned at a diverging angle with respect to said antenna and said main body and is interposed between said user's head and said antenna such that when said radio telephone is positioned in its used position against said user's head, said antenna is angularly directed away from said user's head and on the remote side of the shield for reducing electromagnetic irradiation of said user's head.

32. A portable radio telephone as defined in claim 31 further characterized:

said shield operably connected to the telephone to disable transmission of electromagnetic radiation from said antenna when said shield is in the rest position and to allow transmission of electromagnetic radiation from said antenna when said shield is in the extended raised position.

33. A portable radio antenna as defined in claim 32 further characterized by:

said shield being made from electrically conductive material, and being coupled at the operating frequency of the antenna to an electrical ground of the apparatus.

34. A portable radio telephone having a main body, a keyboard, a display, a headphone, a microphone in proximity to an end of the main body an antenna for transmitting electromagnetic radiation, and a shield, the radio telephone characterized by:

said headphone mounted on said shield;

said shield being hinged in proximity to an edge of said telephone main body and pivotably movable between a retracted rest position and an extendable raised positioned extending out from said edge of said main body;

said shield when in its retracted rest position forms a protective cover for said headphone;

said shield when pivotably moved to its extended raised position moves said headphone away from said microphone and is positioned at a diverging angle with respect to said antenna and extends outwardly and forwardly from a front surface of said main body which houses the display, keyboard, and microphone to form an obtuse angle with said main body, and is interposed between said user's head and said antenna such that when said radio telephone is positioned in its used position against said user's head, said antenna is angularly directed away from said user's head and on the far side of the shield for reducing electromagnetic irradiation of said user's head.

35. A portable radio telephone as defined in claim 34 further characterized by:

said shield operably connected to the telephone such that at least one control function of the phone is disabled when said shield is in the rest position and enabled when said shield is in the extended raised position.

36. A portable radio antenna as defined in claim 35 further characterized by:

said shield being made from electrically conductive material, and being coupled at the operating frequency of the antenna to an electrical ground of the apparatus.

37. A portable radio telephone as claimed in claim 35 further characterized by:

said shield being arranged to disable use of one of said keyboard and display by covering said respective keyboard or display when said shield is in said rest position.

38. A portable radio telephone having a main body, a keyboard, a display, a headphone, a microphone, and an antenna extending out of an upper edge of the main body for transmitting electromagnetic radiation, the radio telephone characterized by:

a protective cover being hinged in proximity to an upper edge of said telephone main body and pivotably movable between a retracted lower rest position and an extendable raised position extending above and forward of said main body;

said headphone being mounted on said protective cover;

said protective cover when in its retractable rest position forms a protective cover for the headphone;

said protective cover when pivotably moved to its extended raised position exposes said headphone for usage, and is positioned at a diverging angle with respect to said antenna and said main body and is interposed between said user's head and said antenna such that when said radio telephone is positioned in its used position against said user's head, said antenna is angularly directed away from said user for reducing electromagnetic irradiation of said user's head.

39. A portable radio telephone as defined in claim 38 further characterized by:

said protective cover operably connected to the telephone such that at least one control function of the phone is disabled when said panel is in the rest position and enabled when said protective cover is in the extended raised position.

40. A portable radio telephone having a main body, a keyboard, a display, a headphone, a microphone in proximity to the lower end of the main body and an antenna for transmitting electromagnetic radiation, the radio telephone characterized by:

a folding protective cover mounting said headphone and being hinged in proximity to an upper edge of said telephone main body and pivotably movable between a retracted rest position and an extendable raised position above and forward of said upper edge of said main body;

said folding protective cover when in its retracted rest position forms a protective cover said headphone;

said folding protective cover when pivotably moved to its extended raised position moves said headphones away from said microphone and is positioned at a diverging angle with respect to said antenna and extends upwardly and forwardly from a front surface of said main body which houses the display, keyboard, and microphone to form an obtuse angle with said main body, and is interposed between said user's head and said antenna such that when said radio telephone is positioned in its used position against said user's head, said antenna is angularly directed away from said user's head for reducing electromagnetic irradiation of said user's head.

41. A portable radio telephone as defined in claim 40 further characterized by:

said folding protective cover operably connected to the telephone such that at least one control function of the phone is disabled when said protective cover is in the rest position and enabled when said panel is in the extended raised position.

42. An apparatus for radio communication comprising:

a main housing; a display; a keyboard; a headphone; an antenna having a radiating section extending from said housing for radiating electromagnetic radiation; and a shield, which under operational conditions is located between the user and the radiating section of the antenna thereby reducing electromagnetic irradiation of the user from said antenna and where the headphone is attached to the shield and moves to its using position with the shield.

* * * * *

UNITED STATES PATENT AND TRADEMARK OFFICE
CERTIFICATE OF CORRECTION

PATENT NO. : 6,259,896 B1
DATED : July 10, 2001
INVENTOR(S) : Sepponen, Raimo E.

It is certified that error appears in the above-identified patent and that said Letters Patent is hereby corrected as shown below:

Drawings,
Figure 4, "HFS" should be changed to -- RFS --.

Column 1,
Line 37, after "what is" delete [not] and insert therein -- set --.
Line 49, after "Figs. 3a-3d" delete [when] and insert therein -- show --.
Line 53, after "show" insert therein -- a --.
Line 59, after "Figs. 9a-9b" delete [shows] and insert therein -- show --.

Column 2,
Line 18, after "the" delete [penetration] and insert therein -- penetrating --.
Line 19, after "penetrating" delete [,].
Line 23, before "layer" delete [CSP] and insert therein -- CSF --.
Line 31, after "along" delete [C] and insert therein -- G --.
Line 37, after "PH," delete [the] and insert therein -- One --.
Line 42, after "RFS" delete [maybe] and insert therein -- may be --.
Line 60, after "also be" insert therein -- enabling --.
Line 60, after "micro-switches" insert therein -- S operated by RFS --.

Column 3,
Line 12, after "RFS" insert therein -- , --.
Line 48, after "havng a" delete [male] and insert therein -- main --.
Line 51, after "exterior" delete [o] and insert therein -- of --.

Column 4,
Line 1, after "its" delete [unable] and insert therein -- usable --.

Column 5,
Line 66, after "shield, the" delete [ratio] and insert therein -- radio --.

Column 6,
Line 41, after "defined" delete [to] and insert therein -- in --.
Line 50, after "hinged" delete [is] and insert therein -- in --.

UNITED STATES PATENT AND TRADEMARK OFFICE
CERTIFICATE OF CORRECTION

PATENT NO. : 6,259,896 B1
DATED : July 10, 2001
INVENTOR(S) : Sepponen, Raimo E.

It is certified that error appears in the above-identified patent and that said Letters Patent is hereby corrected as shown below:

Column 7,
Line 23, after "as" insert therein -- defined --.
Line 64, after "characterized" insert -- by --.

Column 8,
Line 11, after "main body" insert therein -- , --.

Column 9,
Line 27, after "cover" insert therein -- for --.

Signed and Sealed this

Ninth Day of July, 2002

Attest:

JAMES E. ROGAN
Attesting Officer  Director of the United States Patent and Trademark Office